(12) United States Patent
Iwamoto

(10) Patent No.: US 6,964,265 B2
(45) Date of Patent: Nov. 15, 2005

(54) CONNECTING STRUCTURE OF FUEL FILTER AND FUEL PUMP

(75) Inventor: Takashi Iwamoto, Machida (JP)

(73) Assignee: Nifco Inc., Yokohama (JP)

( * ) Notice: Subject to any disclaimer, the term of this patent is extended or adjusted under 35 U.S.C. 154(b) by 3 days.

(21) Appl. No.: 11/049,883

(22) Filed: Feb. 4, 2005

(65) Prior Publication Data
US 2005/0173329 A1 Aug. 11, 2005

(30) Foreign Application Priority Data
Feb. 10, 2004 (JP) .............................. 2004-032909

(51) Int. Cl.[7] .......................................... F02M 37/04
(52) U.S. Cl. ...................... 123/510; 123/509; 210/232; 210/416.4
(58) Field of Search ................ 123/509, 510, 123/495, 497; 210/232, 461, 486, 499, 416.4, 210/460

(56) References Cited

U.S. PATENT DOCUMENTS

| | | | |
|---|---|---|---|
| 3,875,059 A | * 4/1975 | Maschino | .................... 210/172 |
| 4,617,121 A | * 10/1986 | Yokoyama | ................ 210/416.4 |
| 4,783,260 A | * 11/1988 | Kurihara | ...................... 210/232 |
| 5,055,187 A | * 10/1991 | Ito et al. | ....................... 210/172 |
| 5,186,152 A | * 2/1993 | Cortochiato et al. | ........ 123/514 |
| 5,409,608 A | * 4/1995 | Yoshida et al. | .............. 210/315 |
| 5,665,229 A | 9/1997 | Fitzpatrick et al. | |
| 5,928,507 A | * 7/1999 | Chiga | .......................... 210/172 |
| 6,220,454 B1 | * 4/2001 | Chilton | ....................... 210/483 |
| 6,405,716 B2 | * 6/2002 | Braun et al. | ................. 123/509 |
| 6,412,517 B1 | * 7/2002 | Flambert et al. | ............ 137/550 |
| 6,638,423 B2 | * 10/2003 | Dockery | ...................... 210/132 |
| 2005/0006300 A1 | * 1/2005 | Sato et al. | ............... 210/416.4 |

FOREIGN PATENT DOCUMENTS

JP H01-158552 11/1989

* cited by examiner

*Primary Examiner*—Carl S. Miller
(74) *Attorney, Agent, or Firm*—Manabu Kanesaka

(57) ABSTRACT

A connecting structure for connecting a fuel filter and a fuel pump with an inlet. The connecting structure includes a joint bracket to be retained in the fuel tank, and a filter section formed with the fuel filter. The joint bracket includes a pump side connecting portion, and a filter side connecting portion and having a bottom portion with a first positioning hole. The filter section includes a bracket connecting portion abutting against the bottom portion and having a second positioning hole, and a communicating portion communicating with the fuel filter and connected to the fuel pump. A projection is formed at the fuel pump. When the fuel filter is attached to the fuel pump, the bracket connecting portion is attached to the bottom portion and the projection passes the first and second positioning holes and the inlet of the fuel pump is attached to the communicating portion.

6 Claims, 4 Drawing Sheets

CONNECTING STRUCTURE OF FUEL FILTER AND FUEL PUMP

BACKGROUND OF THE INVENTION AND RELATED ART STATEMENT

The present invention relates to a connecting structure between a fuel filter and a fuel pump.

As an automobile fuel pump, there has been known a fuel pump immersed in fuel inside a fuel tank. Generally, a fuel filter is attached to an inlet of a fuel pump for removing a foreign material in fuel. In a conventional fuel filter, an inlet of a fuel pump is fitted into a depression formed in the fuel filter. A conical hole with a reverse claw is formed in a piece integrally formed in the depression, and a projection formed on the fuel pump is inserted into the conical hole, so that the fuel filter does not come off the fuel pump (refer to U.S. Pat. No. 5,665,229).

The connecting structure is designed to prevent the reverse claw from coming off without considering repetitive attachment and removal, thereby making it difficult to replace the fuel filter. When the reverse claw is forced to come off, the connecting structure with the fuel filter may be damaged on the pump side.

In view of the problems described above, an object of the present invention is to provide a connecting structure between a fuel filter and a fuel pump, in which it is possible to provide enough connecting strength and easily separate the fuel filter from the fuel pump.

Further objects and advantages of the invention will be apparent from the following description of the invention.

SUMMARY OF INVENTION

In order to attain the objects described above, according to a first aspect of the present invention, a connecting structure between a fuel filter and a fuel pump includes: a joint bracket supported inside a fuel tank and having a fuel pump connecting portion and a fuel filter connecting portion; a fuel filter having a connecting piece abutting against a bottom wall of the joint bracket and a connecting portion to be connected to an inlet of the fuel pump; through-holes formed in the bottom wall of the joint bracket and the connecting piece; and a projection provided in the fuel pump to be inserted into the through-holes.

According to a second aspect of the present invention, the connecting piece includes a positioning projection for engaging the joint bracket.

According to a third aspect of the present invention, a temporarily-holding member is provided for maintaining a matching state between the through-holes provided in the bottom wall of the joint bracket and the connecting piece.

In the present invention, the joint bracket is disposed inside the fuel tank for supporting the fuel pump, and is provided with the fuel filter connecting portion. The projection is provided on the fuel pump so that the fuel filter does not come off the joint bracket. Accordingly, it is possible to secure a connecting strength between the fuel filter and the fuel pump and eliminate a metal part for fixing the fuel filter, thereby reducing the number of parts and the number of assembling steps. Further, it is possible to remove the fuel filter just by removing the fuel pump from the joint bracket, thereby improving maintenance such as a filter exchange. Also, the temporarily-holding member is provided for maintaining the matching state between the through-holes before the projection provided in the fuel pump is inserted into the through-holes, thereby improving an assembling operation.

DETAILED DESCRIPTION OF PREFERRED EMBODIMENTS

Hereinafter, embodiments of the present invention will be explained in detail with reference to the accompanying drawings.

Figure 1:
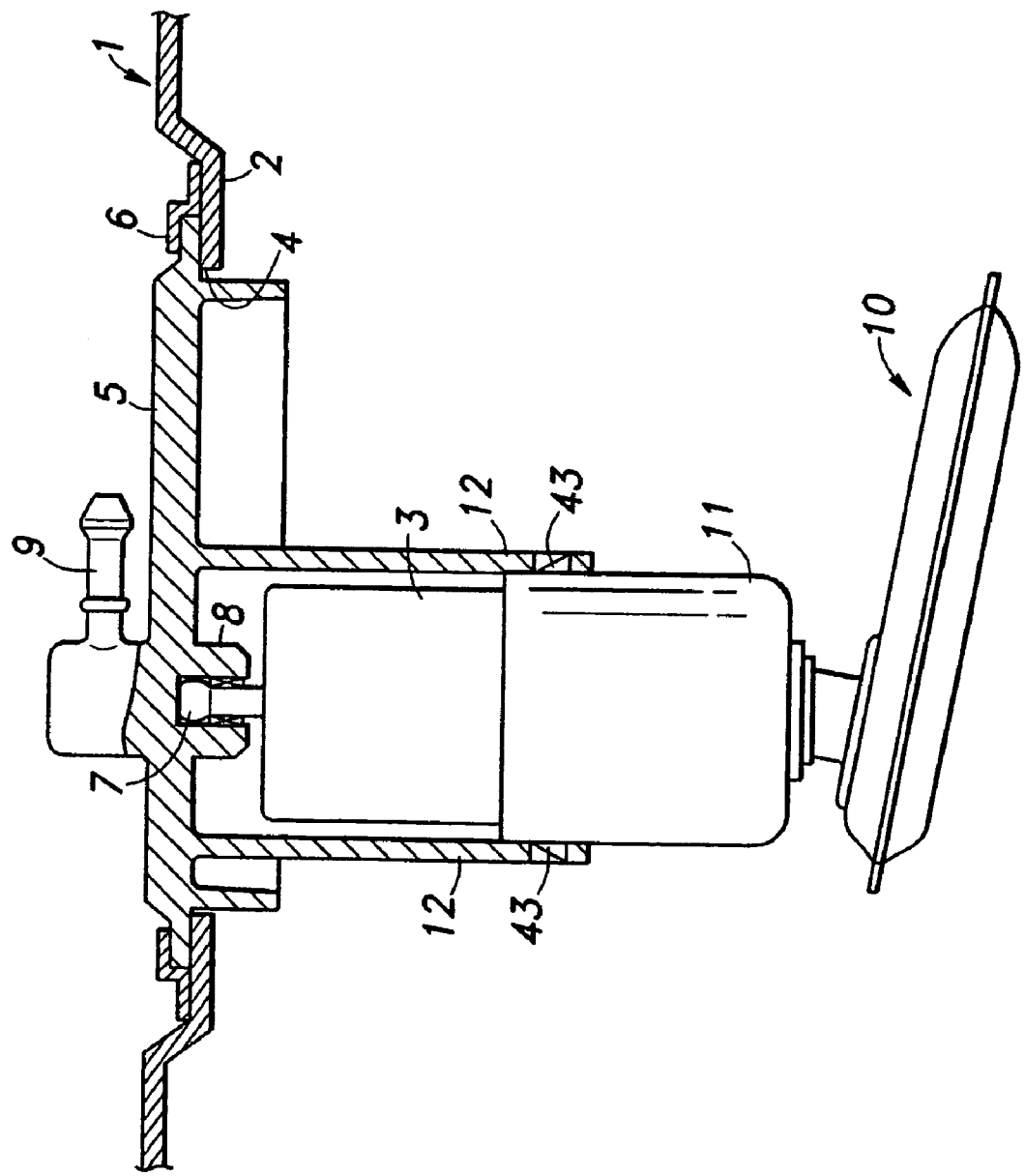
FIG. 1 is a side view showing a partially removed fuel-pump connecting portion of a fuel tank according to an embodiment of the present invention.

FIG. 1 is a side view showing a partially removed fuel-pump connecting portion of a fuel tank according to an embodiment of the present invention. A fuel tank 1 is formed of a synthetic-resin with blow molding, and is provided with an opening 4 in an upper wall 2 thereof for inserting a fuel pump 3. A lid plate 5 with a bottom surface connected to the fuel pump 3 is connected to the opening 4 through a ring-shaped retainer member 6.

The lid plate 5 includes a connecting structure 8 to be connected to a discharge opening 7 of the fuel pump 3; a hose-connecting opening 9 communicating with the connecting structure 8; and a pair of hanging pieces 12 for supporting a joint bracket 11 for fastening the fuel pump 3 to the lid plate 5, and the fuel pump 3 is connected to a fuel filter 10 for removing a foreign matter in fuel.

Figure 2:
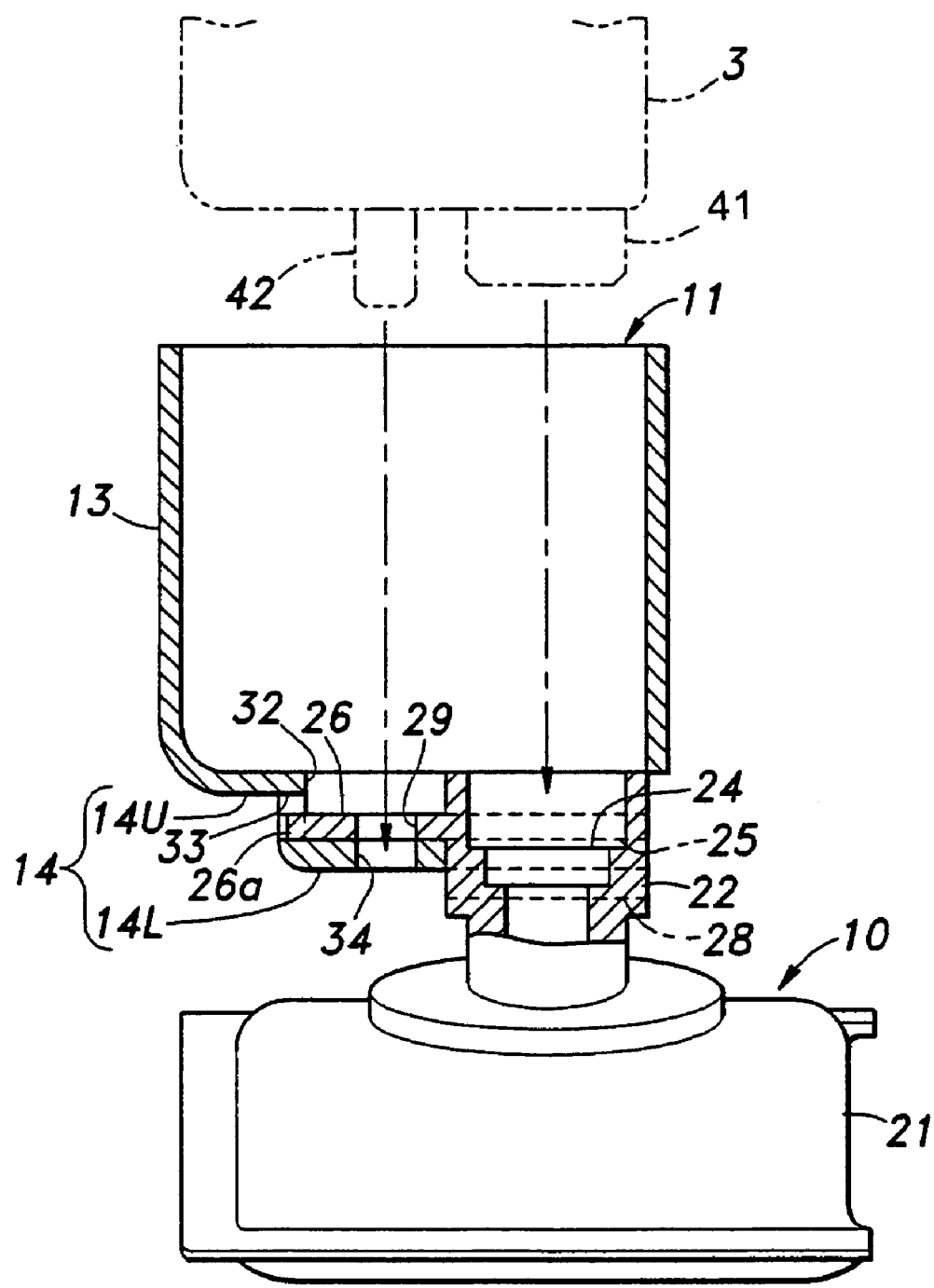
FIG. 2 is a front view showing a partially removed connecting structure according to the embodiment of the present invention.
Figure 3:
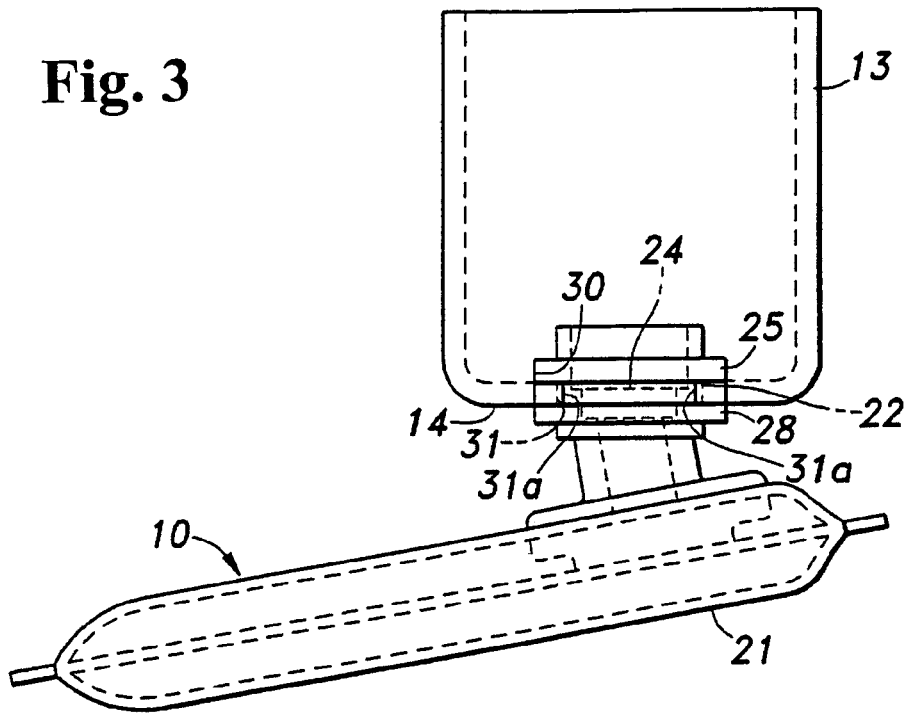
FIG. 3 is a side view of the connecting structure according to the embodiment of the present invention.
Figure 4:
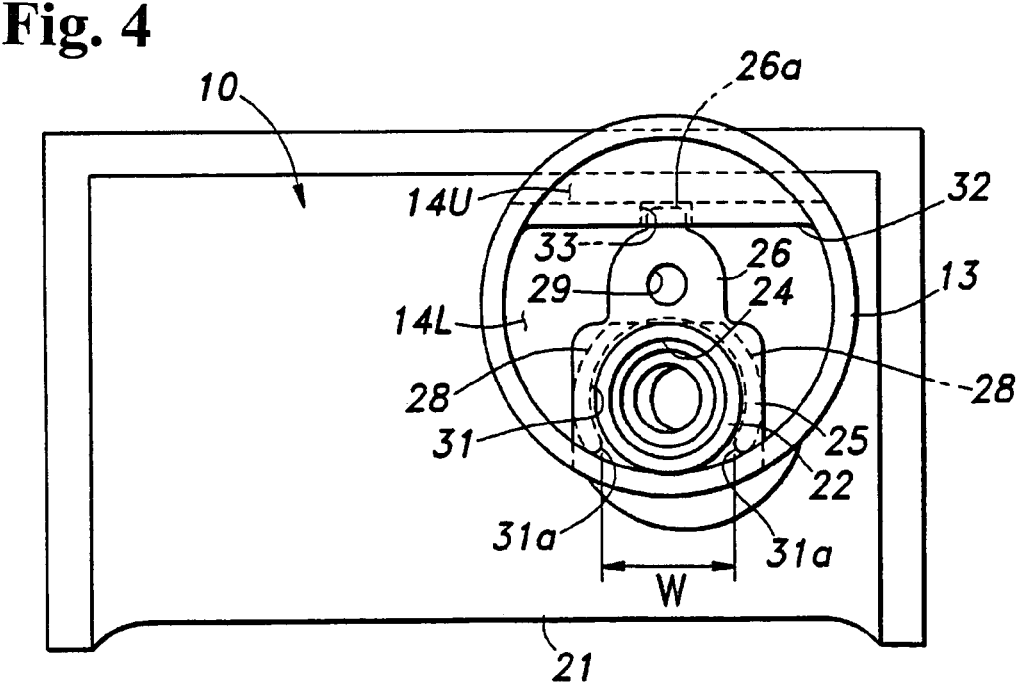
FIG. 4 is a plan view of the connecting structure according to the embodiment of the present invention.

The joint bracket 11 mutually connects the fuel pump 3 to the fuel filter 10, and also supports the fuel pump 3 in the fuel tank 1. As shown in FIGS. 2 to 4, the joint bracket 11 receives a lower half part of the fuel pump 3 in a cylinder portion 13 thereof, and connects the fuel filter 10 to a bottom wall 14 thereof.

The fuel filter 10 is formed of a flat bag member 21 retaining an elastic-shape retaining member; and a pump-connecting boss 22 projecting form an outer surface of the bag member 21. In addition, the fuel filter has a known structure, and a detailed explanation thereof is omitted (refer to Japanese Patent Publication (Kokai) No. 2002-066216).

A depression 24 is formed in the pump-connecting boss 22 for inserting an inlet 41 projecting from a lower surface of the fuel pump 3. On an outer circumferential surface of the pump-connecting boss 22, there are formed a flange portion 25 projecting radially and outwardly; a connecting piece 26 extending from one side of the flange portion 25 in a direction perpendicular to an axis line of the depression 24; and a pair of projecting pieces 28 with a central axis of the pump-connecting boss 22 in between at positions downwardly away from the flange portion 25 in an axial direction by a thickness of the bottom wall 14 of the joint bracket 11. The connecting piece 26 is provided with a circular hole 29 at a position adjacent to the pump-connecting boss 22.

Figure 5:
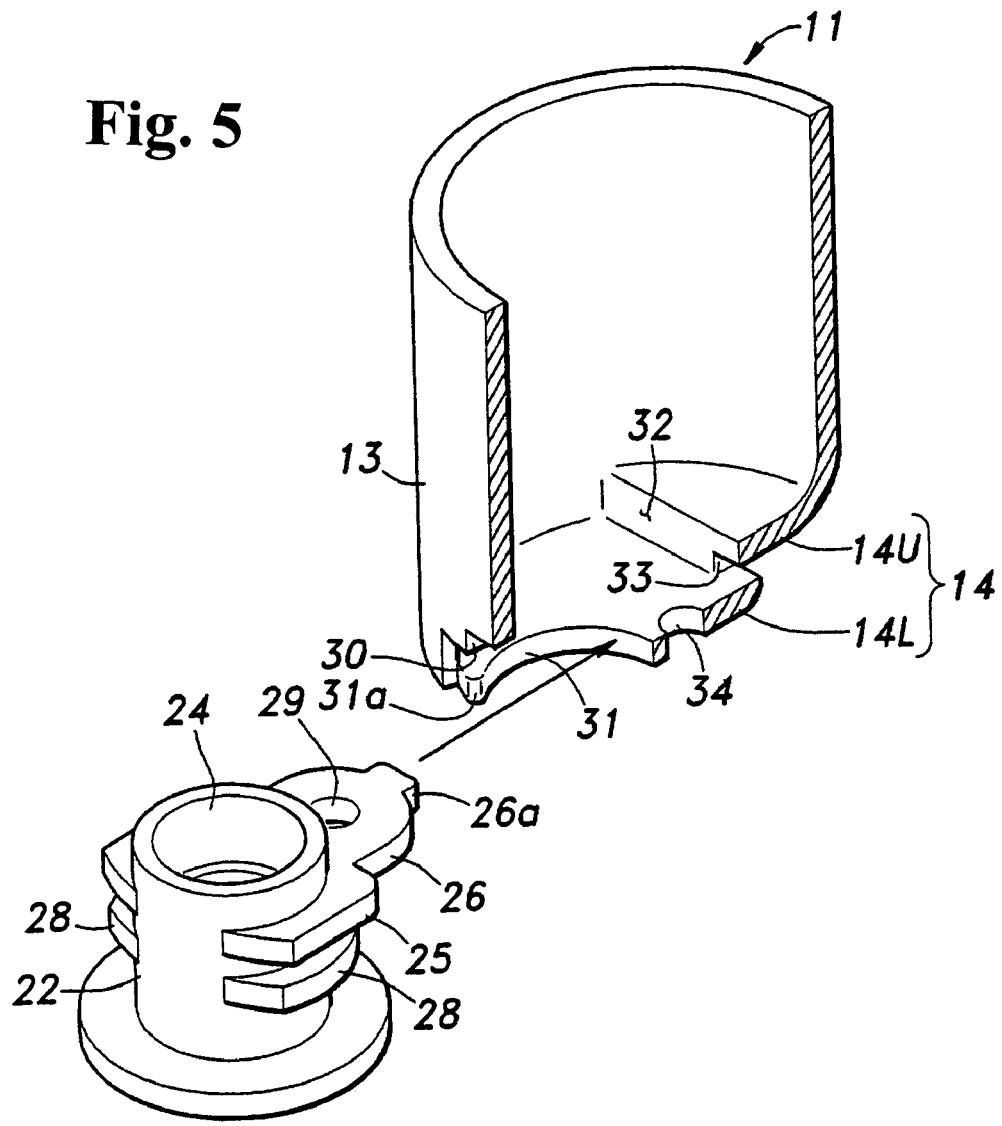
FIG. 5 is a partially sectional perspective view of the connecting structure according to the embodiment of the present invention.

As shown in FIG. 5, the bottom wall 14 of the joint bracket 11 has a step, and a lateral hole 30 and a longitudinal hole 31 are formed at a portion where a lower level 14L and the cylinder portion 13 are connected for receiving the pump-connecting boss 22. A square hole or positioning hole 33 is formed at the center of a longitudinal wall 32 between an upper level 14U and the lower level 14L for receiving a projecting tip 26a of the connecting piece 26. A circular hole 34 similar to the circular hole 29 of the connecting piece 26 is formed between the longitudinal hole 31 and the longitudinal wall 32 of the bottom wall 14 of the joint bracket 11. The longitudinal hole 31 formed in the lower level 14L of the bottom wall 14 of the joint bracket 11 has an opening at a side of the cylinder portion 13 for receiving the connecting boss 22. A width of an opening 31a (W in FIG. 4) is slightly smaller than a diameter of the connecting boss 22.

A process of assembling the connecting structure of the present invention will be explained next. The connecting piece 26 slides on the upper surface of the bottom wall 14 of the joint bracket 11, and the pump-connecting boss 22 is inserted into the longitudinal hole 31 through the lateral hole 30. A peripheral portion of the longitudinal hole 31 is inserted between the flange portion 25 and the projecting pieces 28. The projecting tip 26a of the connecting piece 26 is inserted into the square hole 33 formed in the longitudinal wall 32. Accordingly, the connecting piece 26 is positioned on the upper surface of the bottom wall 14 of the joint bracket 11. The opening 31a has the width smaller than the diameter of the connecting boss 22, and is elastically deformed when the connecting boss 22 is inserted therein. Accordingly, the connecting boss 22 is temporarily held in the longitudinal hole 31. As a result, it is possible to maintain the matching state of the circular hole 29 formed in the bottom wall 14 of the joint bracket 11 and the circular hole 34 of the connecting piece 26.

The fuel inlet 41 and a projection 42 are disposed next to each other on a bottom surface of the fuel pump 3. The circular hole 29 formed in the bottom wall 14 of the joint bracket 11 is matched to the circular hole 34 of the connecting piece 26. Accordingly, when a lower half of the fuel pump 3 is inserted into the cylinder portion 13 of the joint bracket 11 from above, the fuel inlet 41 projecting from the bottom surface of the fuel pump 3 is easily fitted into the depression 24. Also, the projection 42 adjacent to the fuel inlet 41 is easily fitted into both the circular holes 29 and 34 formed in the bottom wall 14 of the joint bracket 11 and the connecting piece 26.

With the structure described above, the connecting piece 26 is fixed to the bottom wall 14 of the joint bracket 11. Triangular projections 43 are provided on an outer circumferential surface of the cylinder portion 13 of the joint bracket 11, and are connected with free ends of the hanging pieces 12 integrally formed in the lid plate 5, so that the fuel pump 3 does not move up and down. As a result, the fuel filter 10 is firmly connected to the joint bracket 11.

When the free ends of the hanging pieces 12 are opened outwardly and removed from the triangular projections 43 of the joint bracket 11, and the fuel pump 3 is pulled out of the joint bracket 11, the fuel filter 10 is easily removed from the bottom wall 13 of the joint bracket 11.

The disclosure of Japanese Patent Application No. 2004-032909, filed on Feb. 10, 2004, is incorporated in the application.

While the invention has been explained with reference to the specific embodiments of the invention, the explanation is illustrative and the invention is limited only by the appended claims.

What is claimed is:

1. A connecting structure for connecting a fuel filter and a fuel pump with an inlet, comprising:
    a joint bracket to be retained in the fuel tank and including a pump side connecting portion to be connected to the fuel pump, and a filter side connecting portion to be connected to the fuel filter and having a bottom portion with a first positioning hole,
    a filter section formed with the fuel filter and including a bracket connecting portion abutting against the bottom portion and having a second positioning hole, and a communicating portion communicating with the fuel filter and adapted to be connected to the inlet of the fuel pump, and
    a projection formed at the fuel pump so that when the fuel filter is attached to the fuel filter through the joint bracket, the bracket connecting portion is attached to the bottom portion and the projection passes the first and second positioning holes and the inlet of the fuel pump is attached to the communicating portion.

2. A connecting structure according to claim 1, wherein said joint bracket further includes a third positioning hole, and said bracket connecting portion further includes a protrusion engaging the third positioning hole.

3. A connecting structure according to claim 2, wherein said filter side connecting portion includes a temporarily-holding member for temporarily holing the filter section in a state such that the first and second positioning holes are aligned together.

4. A connecting structure according to claim 3, wherein said temporarily-holding member includes a side opening formed in the joint bracket, said side opening having a size slightly smaller than a lateral size of the communicating portion of the filter section so that the communicating portion is elastically held inside side opening when the communicating portion is attached to the bracket connecting portion through the side opening.

5. A connecting structure according to claim 4, wherein said filter side connecting portion includes a through hole for receiving the communicating portion therein, and said third positioning hole is formed laterally to receive the protrusion laterally.

6. A connecting structure according to claim 5, wherein said filter section further includes flanges vertically spaced apart from each other to receive the bottom portion therebetween.

* * * * *